(12) United States Patent
Perry et al.

(10) Patent No.: US 8,107,729 B2
(45) Date of Patent: Jan. 31, 2012

(54) METHOD FOR IMPROVING CHARACTER OUTLINES USING MULTIPLE ALIGNMENT ZONES

(75) Inventors: Ronald N. Perry, Cambridge, MA (US); Eric Chan, Belmont, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 562 days.

(21) Appl. No.: 12/359,913

(22) Filed: Jan. 26, 2009

(65) Prior Publication Data

US 2010/0189353 A1 Jul. 29, 2010

(51) Int. Cl.
*G06K 9/00* (2006.01)
(52) U.S. Cl. .......................................... 382/181
(58) Field of Classification Search ........... 382/181–231
See application file for complete search history.

(56) References Cited

U.S. PATENT DOCUMENTS

| | | | |
|---|---|---|---|
| 5,155,805 A | | 10/1992 | Kaasila |
| 5,280,576 A | * | 1/1994 | Cao .............................. 345/469 |
| 5,355,449 A | * | 10/1994 | Lung et al. .................... 345/467 |
| 5,633,991 A | * | 5/1997 | Hakaridani et al. ......... 358/1.11 |

\* cited by examiner

*Primary Examiner* — Alex Liew
(74) *Attorney, Agent, or Firm* — Dirk Brinkman; Gene Vinokur (57) ABSTRACT

A method aligns a character to a sampling grid of an image, where an outline of the character is specified by input pen commands. Points and contours of the input pen commands are determined. An orientation of each contour is determined. A first directed acyclic graph (DAG) is constructed indicating a hierarchical relationship of related contours. Radicals are determined using the first DAG. Simple segments of the contours are determined and merged independently for each radical. Segment pairs and their hinted coordinates are determined. The segment pairs are sorted and a second DAG is constructed for the sorted segment pairs. Collisions between the segment pairs are resolved using the second DAG. The segments pairs, x-free points, and y-free points are fitted to the sampling grid independently for each radical and a result of the fitting is stored in output pen commands.

10 Claims, 8 Drawing Sheets

METHOD FOR IMPROVING CHARACTER OUTLINES USING MULTIPLE ALIGNMENT ZONES

RELATED PATENT APPLICATIONS

The following Patent Applications are all related, co-filed, and incorporated into each other: U.S. Non-Provisional patent application Ser. No. 12/359,913, "Method for Improving Character Outlines Using Multiple Alignment Zones," filed by Perry et al. on Jan. 26, 2009; U.S. Non-Provisional patent application Ser. No. 12/359,882, "Method for Improving Uniform Width Character Strokes Using Multiple Alignment Zones," filed by Perry et al. on Jan. 26, 2009; and U.S. Non-Provisional patent application Ser. No. 12/359,819 "Method for Converting Outline Characters to Stylized Stroke Characters," filed by Jakubiak et al. on Jan. 26, 2009.

FIELD OF THE INVENTION

The invention relates generally to rendering characters, and more particularly to grid aligning characters represented by outlines.

BACKGROUND OF THE INVENTION

Grid Fitting

Figure 1A:
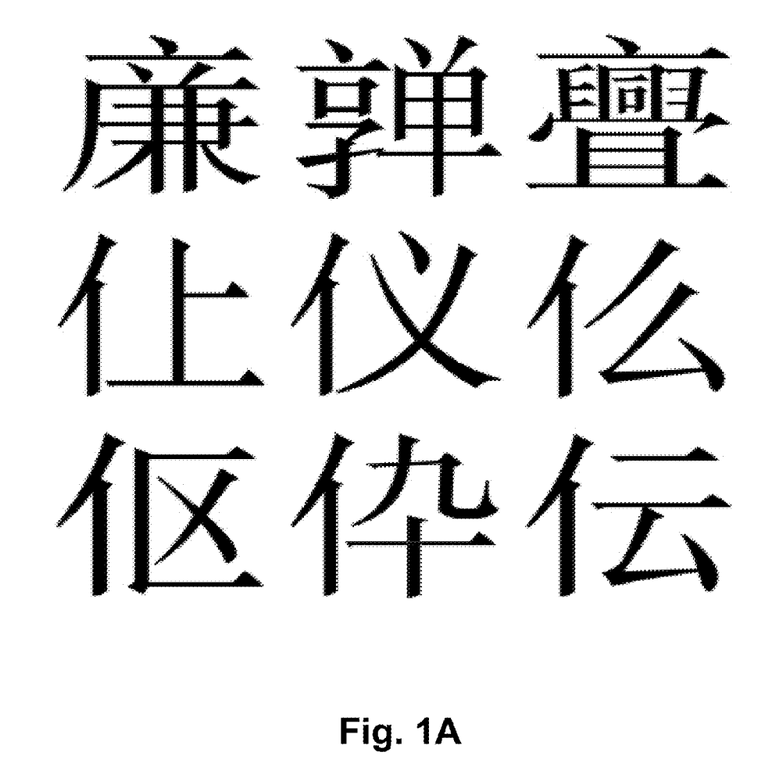
FIG. 1A is a diagram of outline characters to be aligned according to embodiments of the invention.

Rendering characters or glyphs for display and printing is problematic, particularly if the characters are complex. This is particularly true for Chinese, Japanese, and Korean (CJK) character sets, see FIG. 1A. The characters shown are represented by outlines as described in the TrueType Reference Manual, Apple Computer, Inc. It is an object of the invention to automatically align the outlines to a sampling grid (e.g., a pixel or sub-pixel grid) for the purpose of rendering, see the related Applications.

Hints

Hints are a set of rules or procedures stored with each glyph to specify how the glyph should be modified during rendering to preserve features such as symmetry, stroke weight, and a uniform appearance across all the glyphs in a typeface. Hinting requires aligning edges of characters to the sampling grid. At small screen sizes, with or without antialiasing, hinting is critical for producing clear and legible text for human readers. Hinting can be manual, automatic, or combinations thereof.

Manual hinting is labor intensive and expensive. For example, developing a well-hinted typeface for a Japanese or Chinese font, which can have more than ten thousand glyphs, can take years. Because the focus of hinting is on improving the rendering quality of body type, the hints tend to be ineffective for type placed along arbitrary paths and for animated type.

Current methods for automatic hinting produce reasonable results for simple scripts such as Latin, but are inadequate for complex scripts such as Chinese and Japanese. Consequently, there is a need for an automatic hinting method that can effectively handle complex glyphs. With automatic hinting, labor cost is eliminated and font size is significantly reduced because manual hints, which are stored in a font file, are no longer needed.

SUMMARY OF THE INVENTION

A method aligns a character to a sampling grid of an image, where an original path tracing an outline of the character is specified by input pen commands having original coordinates. Points and contours of the input pen commands are determined. An orientation of each contour is determined. A first directed acyclic graph (DAG) is constructed indicating a hierarchical relationship of related contours. Radicals of a group of related contours are determined using the first DAG. Simple segments of the contours are determined. The simple segments are merged independently for each radical. Segment pairs for the merged segments are determined. Hinted coordinates for the segment pairs are determined. The segment pairs are sorted and a second DAG is constructed for the sorted segment pairs. Collisions between the segment pairs are resolved using the second DAG. x-free points and y-free points are determined for each radical. The segments pairs, the x-free points, and the y-free points are fitted to the sampling grid independently for each radical and a result of the fitting is stored in output pen commands having the hinted coordinates thereby aligning the outline of the character to the sampling grid of the image.

DETAILED DESCRIPTION OF THE PREFERRED EMBODIMENT

Alignment and Grid Fitting

Figure 1B:
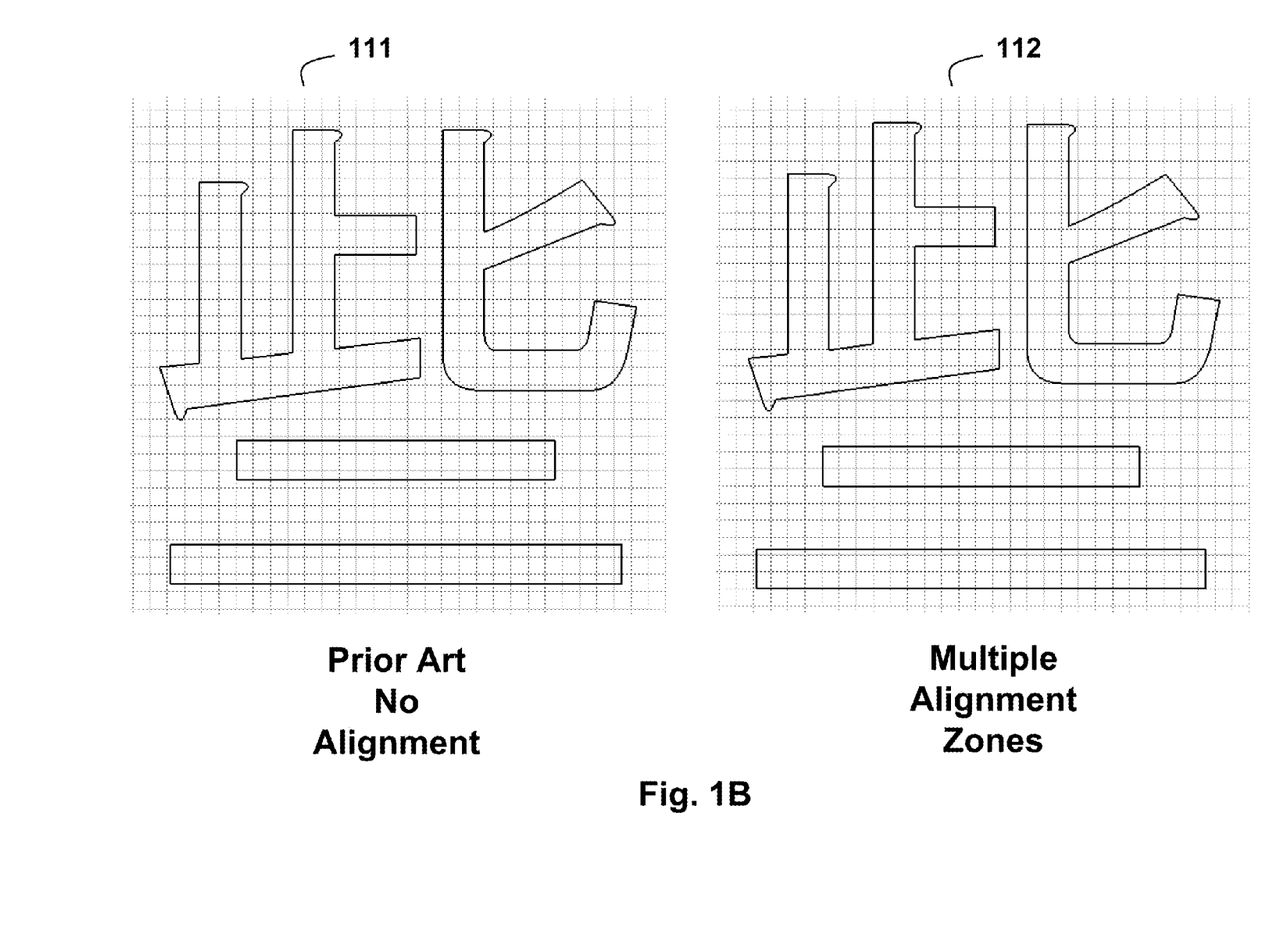
FIG. 1B depicts sampling grids with comparative alignment of a character.

FIG. 1B shows a Chinese character on a sampling grid with no alignment 111 and alignment 112 according to embodiments of the invention. Because the invention detects and aligns multiple zones in a character, the method is called multiple alignment zones (MAZ).

Figure 2A:
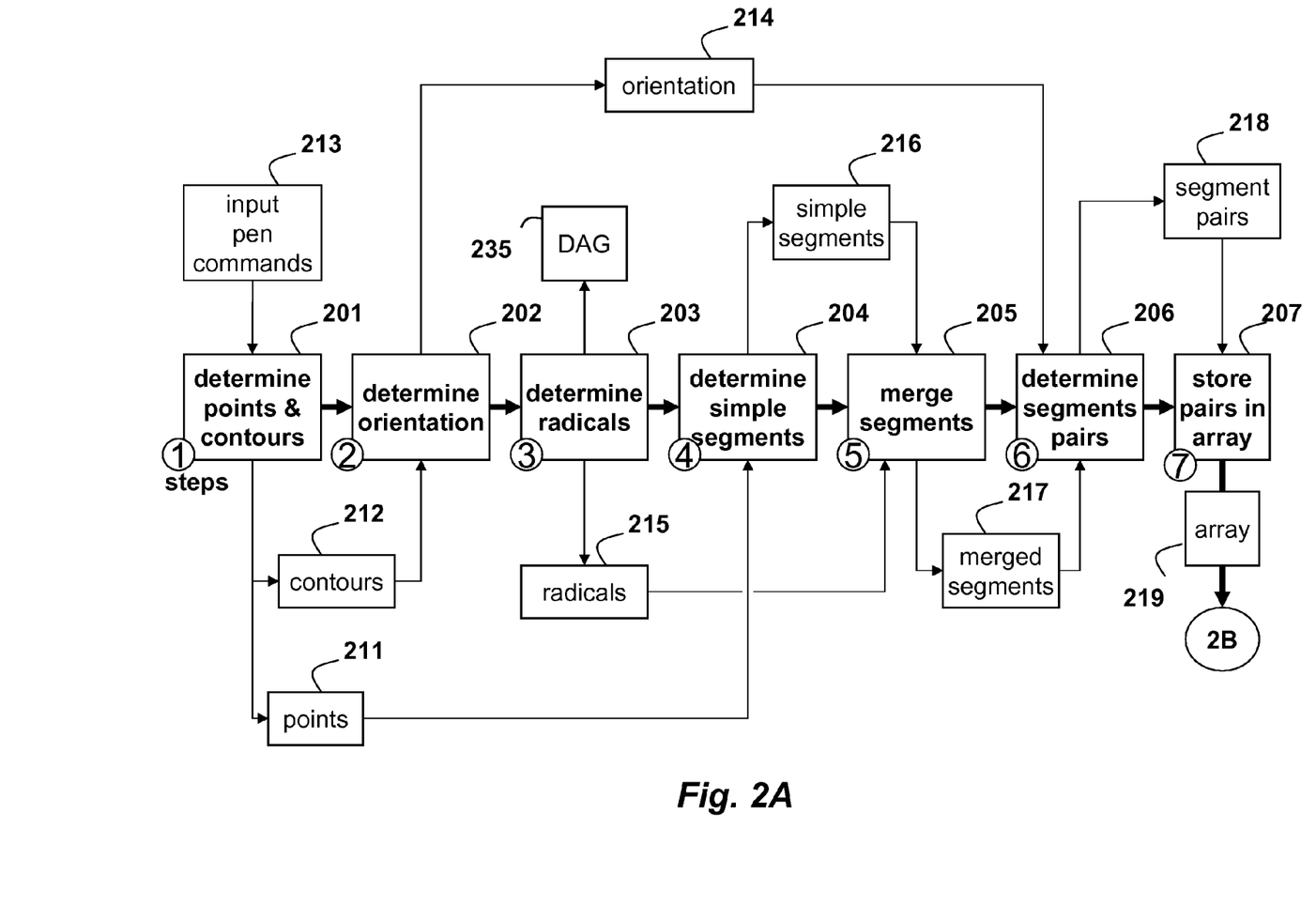
FIGS. 2A and 2B are a flow diagram of a method for aligning outline characters according to embodiments of the invention.
Figure 2B:
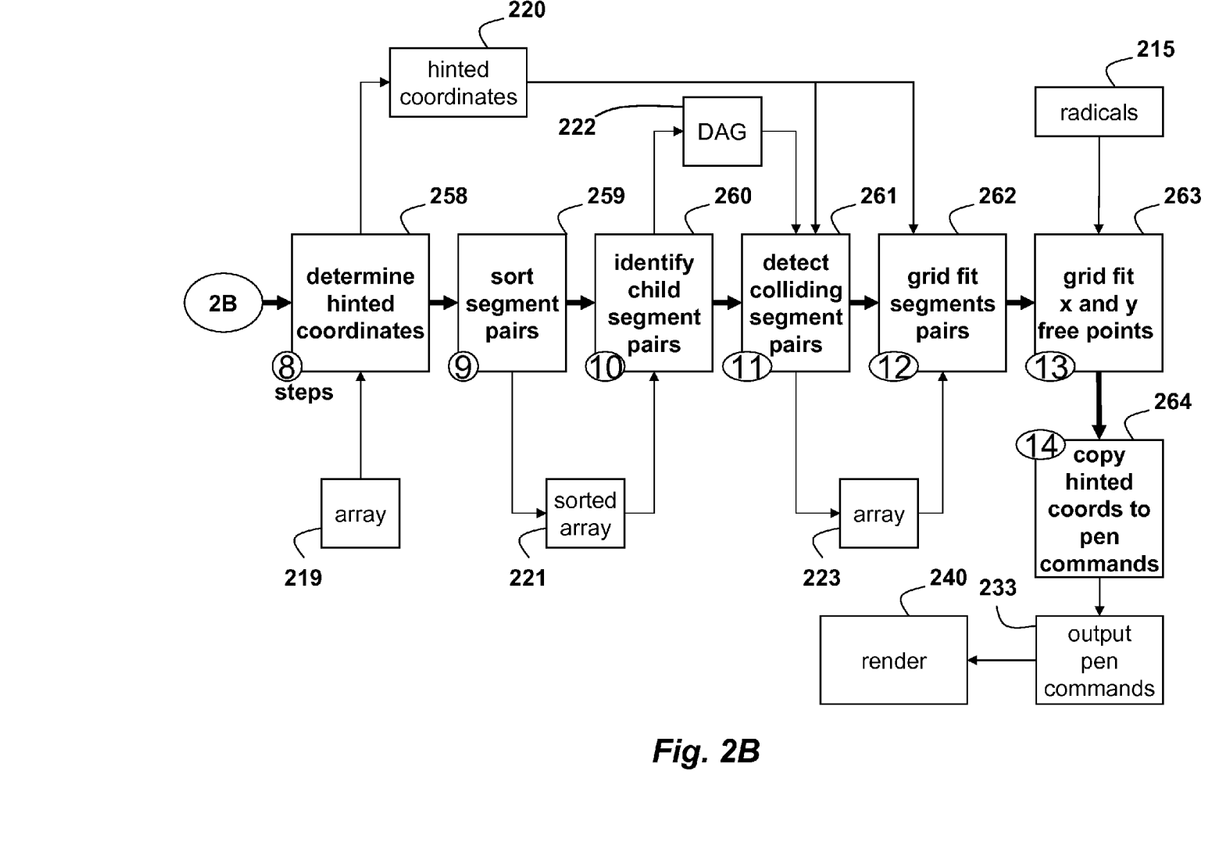

As shown in FIGS. 2A-2B, a method for aligning characters to a sampling grid (e.g., a pixel or sub-pixel grid of an image to be displayed on a screen) takes as input 213 pen commands that trace an outline of the character. The method modifies original coordinates of the pen commands to "hinted" coordinates.

Paths

Outlines of characters to be rendered are represented by a path. The path according to embodiments of the invention is composed of a sequence of pen commands, e.g., moveto, lineto, and curveto, which define an outline for a character, see TrueType Reference Manual, Apple Computer, Inc. The path representation enables arbitrary scaling, rotating, and other transformations.

The sequence of pen commands specify the movement and drawing of a virtual pen tracing the outline, and allow both line segments and Bézier curve segments to be drawn. The endpoints and control vertices of each segment are specified in floating point image units.

Example pen commands follow; note that all coordinates (i.e., x, y, cx, and cy) are specified in floating point image units:

moveto x y—Starts a new path (i.e., a new contour). This command sets the current point to (x,y).

lineto x y—Appends a straight line segment to the current path (i.e., the current contour). The line segment extends from the current point to (x,y). After constructing the line segment, (x,y) becomes the new current point.

curveto cx cy x y—Appends a quadratic Bezier curve segment to the current path (i.e., the current contour) between the current point and (x,y) using (cx,cy) as the Bezier control point. After constructing the curve segment, (x,y) becomes the new current point.

The path follows the TrueType convention for rendering characters, see U.S. Pat. No. 5,155,805, "Method and apparatus for moving control points in displaying digital typeface on raster output devices", issued to Kaasila on Oct. 13, 1992, and incorporated herein by reference.

Overview of Alignment Method

The input 213 to the method for multiple alignment zone (MAZ) detection and grid fitting is a sequence of pen commands representing an outline-based character and pixels per em (ppem), the number of pixels per em to be used for rendering the character, i.e., the scale of the character. The method aligns the coordinates of the pen commands to the sampling grid, i.e., the pen commands are automatically hinted.

The following definitions and terms are organized into several categories to facilitate comprehension of this description of the invention.

Point

A "point" is a two-dimensional set of coordinates (x, y). An "on-curve point" is a point that lies on the outline of an outline-based character. An "off-curve point" is a point that may or may not lie on the outline of an outline-based character, such as the control point for a quadratic Bézier curve segment.

The "original x coordinate" and the "original y coordinate" of a point P are the x and y coordinates of the point P in real-valued image coordinates before grid fitting is applied, respectively. The "hinted x coordinate" and the "hinted y coordinate" of the point P are the x and y coordinates of the point P in real-valued image coordinates after grid fitting is applied, respectively.

The "absolute difference" between two numerical values a and b is |a−b| i.e., the absolute value of the difference (a−b).

The "original x-distance" between two points P1 and P2 is the absolute difference between the original x coordinate of point P1 and the original x coordinate of point P2. The "original y-distance" between two points P1 and P2 is the absolute difference between the original y coordinate of the point P1 and the original y coordinate of P2.

Contour and Radical

A "contour" C represents an ordered sequence of points P1, P2, ..., P{n}, where n is two or greater. The contour defines a closed path of the outline-based character. Point P{i} "precedes" point P{j} if i<j. Similarly, P{i} "follows" point P{j} if i>j. Two points P{i} and P{i+1} are "consecutive." Point P{i} "immediately precedes" point P{i+1}, and point P{i+1} "immediately follows" point P{i}. Thus, the sequence of points implies an orientation of the contour.

An "outer contour" is a contour that defines the outer boundary of a filled region of an outline-based character, e.g., the outer contour in the letter 'O'. An "inner contour" is a contour that defines the inner boundary of a filled region of an outline-based character, e.g., the inner contour in the letter 'O'.

A "bounding box" of a non-degenerate contour C is a two-dimensional rectangle with the smallest area, determined using the original coordinates, which contains all of the points comprising the contour C. The "bounding box" of a degenerate contour C, i.e., a contour whose points are collinear, is the shortest line segment that contains all of the points comprising the contour C.

A contour C is "oriented clockwise" if the points that define C's closed path follow a clockwise direction when traversing the closed path in a sequential order. Similarly, the contour C is "oriented counterclockwise" if the points that define C's closed path follow a counterclockwise direction when traversing the closed path in the sequential order.

Let P and C be contours. Contour P is the "parent" of contour C if and only if P is the contour with the smallest bounding box, measured by area, that contains C's bounding box. If P exists, then C is a "child" of P. If no such P exists, then C has no parent contour. Contours that have no parent contours are called "root contours". All other contours (i.e., contours that do have parent contours) are called "internal contours". A contour may have at most one parent contour.

Let A and D be contours. Contour D is a "descendant" of A if and only if (1) D is a child of A, or (2) there exists some ordered sequence of contours C1, C2, ..., C{n}, where n is greater than 1, such that D is a child of C1, C{i} is a child of C{i+1}, where i is an integer that lies in the range [1, n−1], and C{n} is a child of A. If D is a descendant of A, then A is an "ancestor" of D.

A "radical" is a set of related contours R, C1, C2, ..., C{n}, where n is greater than or equal to zero, defined by a single root contour R and all of R's descendants, i.e., each C{i} is a descendant of R.

Simple Segment

A "horizontal simple segment" H consists of two consecutive points P1 and P2 in a contour such that P1's original y coordinate is approximately equal to P2's original y coordinate. The original y coordinates of P1 and P2 are considered approximately equal if their absolute difference is less than a pre-defined constant "EQUAL_EPS", where EQUAL_EPS is specified in real-valued image units. P1 is called the "first point" in the segment H, and P2 is called the "second point" in H.

A "vertical simple segment" V consists of two consecutive points P1 and P2 in a contour such that P1's original x coordinate is approximately equal to P2's original x coordinate. The original x coordinates of P1 and P2 are considered approximately equal if their absolute difference is less than EQUAL_EPS units. P1 is called the "first point" in the segment V, and P2 is called the "second point" in V.

The general term "simple segment" refers to either a horizontal simple segment or a vertical simple segment A horizontal simple segment H is oriented from "left to right" if the original x coordinate of H's first point is less than the original x coordinate of H's second point. Segment H is oriented from "right to left" if the original x coordinate of H's first point is greater than or equal to the original x coordinate of H's second point. Segment H is "increasing" if segment H is oriented from left to right and "decreasing" if segment H is oriented from right to left.

A vertical simple segment V is oriented from "bottom to top" if the original y coordinate of V's first point is less than the original y coordinate of V's second point. V is oriented from "top to bottom" if the original y coordinate of V's first point is greater than or equal to the original y coordinate of V's second point. V is "increasing" if V is oriented from bottom to top and "decreasing" if V is oriented from top to bottom.

Opposite Orientation

Figure 5A:
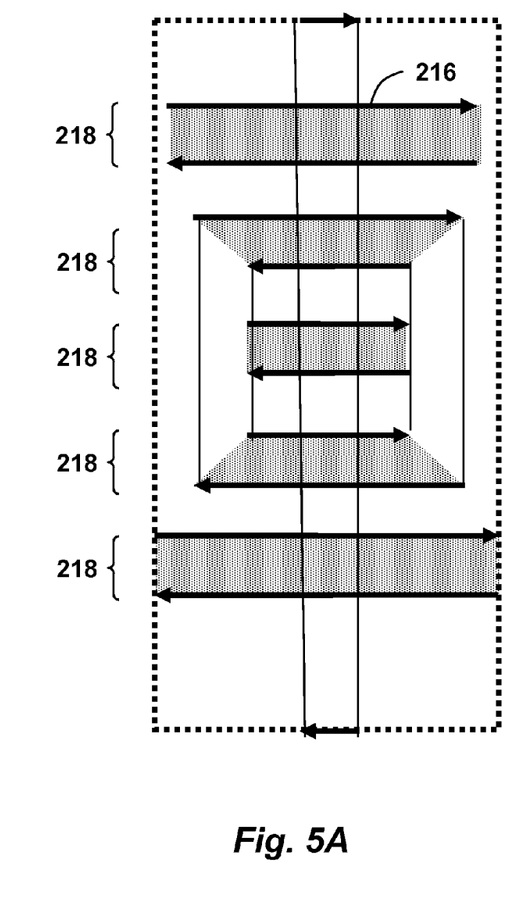
FIGS. 5A and 5B are diagrams of horizontal and vertical segment pairs according to embodiments of the invention.

As shown in FIG. 5A, a pair 218 of horizontal simple segments H1 and H2 have "opposite orientations" if either:

(1) H1 is oriented from left to right and H2 is oriented from right to left, or (2) H1 is oriented from right to left and H2 is oriented from left to right.

A pair of vertical simple segments V1 and V2 have "opposite orientations" if either: (1) V1 is oriented from bottom to top and V2 is oriented from top to bottom, or (2) V1 is oriented from top to bottom and V2 is oriented from bottom to top.

Length

The "length" of a horizontal simple segment H is the absolute difference between the original x coordinate of H's first point and the original x coordinate of H's second point. The "length" of a vertical simple segment V is the absolute difference between the original y coordinate of V's first point and the original y coordinate of V's second point.

Slope

The "original slope" of a simple segment S is the ratio dy/dx, where dy=y2−y1, dx=x2−x1, y1 is the original y coordinate of S's first point, y2 is the original y coordinate of S's second point, x1 is the original x coordinate of S's first point, and x2 is the original x coordinate of S's second point. A vertical simple segment whose first point and second point have identical original x coordinates has an undefined original slope, because the denominator dx is zero.

Merged Segment

A "horizontal merged segment" consists of one or more distinct horizontal simple segments H1, H2, . . . , H{n}, where n≧1, which satisfy all three of the following conditions: (1) H1 . . . , H{n} all have the same orientation, (2) H1 . . . , H{n} are all contained in the same radical, and (3) the original y coordinates of the first points in H{i} and H{j}, where i and j are any integers in the range [1, n], differ by less than (2*EQUAL_EPS) units in real-valued image coordinates.

Because the original y coordinates of the first and second points in a horizontal simple segment differ by less than EQUAL_EPS units in real-valued image coordinates, condition (3) implies that the original y coordinates of the second points in H{i} and H{j}, where i and j are any integers that lie in the range [1, n], differ by less than (3*EQUAL_EPS) units in real-valued image coordinates.

A "vertical merged segment" consists of one or more distinct vertical simple segments V1, V2, . . . , V{n}, where n≧1, that satisfy all three of the following conditions: (1) V1 . . . , V{n} all have the same orientation, (2) V1 . . . , V{n} are all contained in the same radical, and (3) the original x coordinates of the first points in V{i} and V{j}, where i and j are any integers that lie in the range [1,n], differ by less than (2*EQUAL_EPS) units in real-valued image coordinates.

Because the original x coordinates of the first and second points in a vertical simple segment differ by less than EQUAL_EPS units in real-valued image coordinates, condition (3) implies that the original x coordinates of the second points in V{i} and V{j}, where i and j are any integers that lie in the range [1, n], differ by less than (3*EQUAL_EPS) units in real-valued image coordinates.

The general term "merged segment" refers to either a horizontal merged segment or a vertical merged segment.

A point P is contained in a merged segment M if: (1) point P is contained in a simple segment S, and (2) S is contained in M.

Let H be a horizontal merged segment whose minimum original x coordinate over all points in segment H is xMin, and whose maximum original x coordinate over all points in segment H is xMax. The "length" of segment H is the difference between xMax and xMin, i.e., xMax−xMin.

Let V be a vertical merged segment whose minimum original y coordinate over all points in V is yMin, and whose maximum original y coordinate over all points in V is yMax.

The "length" of segment V is the difference between yMax and yMin, i.e., yMax−yMin.

The "original slope" of a merged segment M is the set of original slopes s1, s2, . . . , s{n} where n≧1 and s{i} is the original slope of the ith simple segment in M.

Let H1 and H2 be horizontal merged segments with lengths L1 and L2, respectively. Let L be the maximum of L1 and L2. Informally, the "overlap ratio" between H1 and H2 is the amount of horizontal overlap between H1 and H2 divided by the length of the longer segment. Formally, the "overlap ratio" between H1 and H2 is defined as MIN(xMax1, xMax2)−MAX(xMin1, xMin2))/L, where xMin1 is the minimum original x coordinate over all points in H1, xMin2 is the minimum original x coordinate over all points in H2, xMax1 is the maximum original x coordinate over all points in H1, and xMax2 is the maximum original x coordinate over all points in H2.

Let V1 and V2 be vertical merged segments with lengths L1 and L2, respectively. Let L be the maximum of L1 and L2. Informally, the "overlap ratio" between V1 and V2 is the amount of vertical overlap between V1 and V2 divided by the length of the longer segment. Formally, the "overlap ratio" between V1 and V2 is defined as MIN(yMax1, yMax2)−MAX(yMin1, yMin2))/L, where yMin1 is the minimum original y coordinate over all points in V1, yMin2 is the minimum original y coordinate over all points in V2, yMax1 is the maximum original y coordinate over all points in V1, and yMax2 is the maximum original y coordinate over all points in V2.

The "first point" in a merged segment M is the first point in the first simple segment in M. Merged segments are represented as linked lists of simple segments. The first simple segment in M is the first element of M's linked list of simple segments.

Segment Pair

As shown in FIG. 5A, a "horizontal segment pair" 218 is a pair of two distinct horizontal merged segments 218 H1 and H2, written as {H1, H2}, such that: (1) H1 and H2 are contained in the same radical, (2) H1 and H2 have opposite orientations, and (3) the original y coordinate of H1's first point is less than the original y coordinate of H2's first point. H1 is called the "minimum paired segment" of the segment pair {H1, H2} and H2 is called the "maximum paired segment" of the segment pair {H1, H2}. H1 and H2 are "paired" with each other.

A "vertical segment pair" is a pair of two distinct vertical merged segments V1 and V2, written as {V1, V2}, such that: (1) V1 and V2 are contained in the same radical, (2) V1 and V2 have opposite orientations, and (3) the original x coordinate of V1's first point is less than the original x coordinate of V2's first point. V1 is called the "minimum paired segment" of the segment pair {V1, V2} and V2 is called the "maximum paired segment" of the segment pair {V1, V2}. V1 and V2 are "paired" with each other.

The general term "segment pair" 512 refers to either a horizontal segment pair or a vertical segment pair.

The term "paired segment" refers to either one of the two merged segments in a segment pair.

An "unpaired segment" is either: (1) a horizontal merged segment that is not paired with any other horizontal merged segment, or (2) a vertical merged segment that is not paired with any other vertical merged segment.

Let segment H be a horizontal merged segment whose minimum original y coordinate over all points in segment H is yMin and whose maximum original y coordinate over all points in segment H is yMax. The "original middle y coordinate" of segment H is the average of yMin and yMax, i.e., 0.5*(yMin+yMax).

Let segment V be a vertical merged segment whose minimum original x coordinate over all points in V is xMin and whose maximum original x coordinate over all points in V is xMax. The "original middle x coordinate" of V is the average of xMin and xMax, i.e., 0.5*(xMin+xMax).

The "first pair width" of a horizontal segment pair {H1, H2} is the difference between the original y coordinate of H2's first point and the original y coordinate of H1's first point. The "first pair width" of a vertical segment pair {V1, V2} is the difference between the original x coordinate of V2's first point and the original x coordinate of V1's first point.

The "original pair width" of a horizontal segment pair {H1, H2} is the difference between H2's original middle y coordinate and H1's original middle y coordinate. The "original pair width" of a vertical segment pair {V1, V2} is the difference between V2's original middle x coordinate and V1's original middle x coordinate.

A segment pair P1 is "thicker" than a segment pair P2 if P1's first pair width is greater than P2's first pair width. P1 is "thinner" than P2 if P1's first pair width is less than P2's first pair width.

Grid Fitting Terminology

A "half-integer" is an element n of the set of real numbers such that n=k+0.5 for some integer k, e.g., −2.5, −1.5, −0.5, 0.5, 1.5, 2.5, and 3.5 are all half-integers.

An "integer pixel grid" is the set of ordered pairs (x, y) of real numbers x and y such that at least one element of (x, y) is an integer. For example, (0, 0), (1.5, 0), and (1.97, 3) lie on the integer pixel grid, but (1.7, 11.2) does not. Geometrically, the integer pixel grid is a grid comprising the set of integer horizontal lines, e.g., y=−2, y=−1, y=0, y=1, and y=2, and the set of integer vertical lines, e.g., x=−2, x=−1, x=0, x=1, and x=2.

The "half-integer pixel grid" is the set of ordered pairs (x, y) of real numbers x and y such that at least one element of (x, y) is a half-integer. For example, (0, 0.5), (1.5, 0), and (1.97, 2.5) lie on the half-integer pixel grid, but (1.7, 11.2) does not. Geometrically, the half-integer pixel grid is a grid comprising the set of half-integer horizontal lines, e.g., y=−2.5, y=−1.5, y=−0.5, y=0.5, y=1.5, and y=2.5, and the set of half-integer vertical lines, e.g., x=−2.5, x=−1.5, x=−0.5, x=0.5, x=1.5, and x=2.5.

Collision Terminology

Two horizontal segment pairs H1={A1, B1} and H2={A2, B2} "overlap" if there exists a vertical line V such that V intersects either A1 or B1, and V intersects either A2 or B2. Similarly, two vertical segment pairs V1={A1, B1} and V2={A2, B2} "overlap" if there exists a horizontal line H such that H intersects either A1 or B1 and H intersects either A2 or B2.

The "original coordinate of a horizontal segment pair" H={H1, H2} is the original middle y coordinate of H1. Similarly, the "original coordinate of a vertical segment pair" V={V1, V2} is the original middle x coordinate of V1.

The "hinted coordinate of a horizontal segment pair" H={H1, H2} is the y coordinate of H1 in real-valued image coordinates after grid fitting has been applied. The "hinted coordinate of a vertical segment pair" V={V1, V2} is the x coordinate of V1 in real-valued image coordinates after grid fitting has been applied.

Let P1 and P2 be segment pairs with original coordinates c1 and c2, respectively. P1 and P2 are in "ascending order" if c1 is less than or equal to c2 and in "descending order" if c1 is greater than or equal to c2. The terms "ascending order" and "descending order" apply generally to any number of segment pairs, e.g., four segment pairs.

Let P1, P2, and P3 be segment pairs in ascending order. P2 lies "between" P1 and P3 if and only if: (1) P1 overlaps P2, and (2) P2 overlaps P3.

A segment pair C is a "child" or "child segment pair" of a segment pair P if and only if all three of the following conditions are satisfied: (1) C's original coordinate≦P's original coordinate, (2) C overlaps P, and (3) no segment pair lies between C and P.

Segment pair P is the "parent" or "parent segment pair" of a segment pair C if and only if C is the child of P. If P has multiple child segment pairs, the child segment pairs are referred to as the "children" of P.

A segment pair D is a "descendant" of a segment pair P if and only if: (1) D is a child of P, or (2) there exists some ordered sequence of segment pairs P1, P2, . . . , Pn, where n≧1, such that D is a child of P1, P{i} is a child of P{i+1}, where 1≦i<n, and Pn is a child of P. If D is a descendant of P, then P is an "ancestor" of D.

A "segment pair tree" is the set of segment pairs defined by a segment pair P, and all descendants of P. The segment pair P is the "root segment pair" of the segment pair tree. The segment pair tree forms a directed acyclic graph (DAG) of segments pairs.

A segment pair P is "rounded up" if P's hinted coordinate h is equal to the minimum integer greater than P's original coordinate o minus 0.5, i.e., the segment pair P is rounded up if h is equal to floor(o−0.5)+1. The function floor(argument) produces the largest integer less than or equal to (argument).

Similarly, P is "rounded down" if P's hinted coordinate h is equal to the maximum integer not greater than P's original coordinate o minus 0.5, i.e., the segment pair P is rounded down if h is equal to floor(o−0.5).

Rendering is performed with samples located at pixel centers. Therefore, the method described below performs grid fitting by aligning coordinates to half-integers, e.g., 0.5, 1.5, and 2.5. The unorthodox definitions of "rounded up" and "rounded down" are due to this method's use of integer coordinates, instead of half-integer coordinates, to optimize performance and to maximize code re-use between floating point and fixed point implementations, see Steps 8 through 11 below.

A segment pair tree is rounded up if every segment pair in the segment pair tree is rounded up. Similarly, a segment pair tree is rounded down if every segment pair in the segment pair tree is rounded down.

A segment pair P1 is "aligned" to another segment pair P2 if P1 has the same hinted coordinate as P2.

Let P1 and P2 be two segment pairs such that the hinted coordinate of P1 is greater than the hinted coordinate of P2. Let W be the original pair width of P2 in real-valued image coordinates. Segment pairs P1 and P2 "collide" if: (1) they overlap, and (2) their hinted coordinates differ by at most W units in real-valued image coordinates.

P1 and P2 "barely collide" if: (1) they collide, and (2) their hinted coordinates differ by exactly W units in real-valued image coordinates.

Anchor Point Terminology

If P is a point contained in a horizontal paired segment H, then point P is a "y-aligned" point. Otherwise, point P is a "y-free" point.

If P is a point contained in a vertical paired segment V, then point P is an "x-aligned" point. Otherwise, point P is an "x-free" point.

Let contour C include a sequence of points P1, P2, ..., P{n}, where n≧2. Let P{i} be an x-free point:

The "previous x anchor point" of P{i} is the first x-aligned point found during a backwards traversal through the sequence of points starting from P{i} and wrapping around from P1 to P{n}, i.e., P{i}, P{i−1}, ..., P2, P1, P{n}, P{n−1}, ..., P{i+1}. If contour C does not contain any x-aligned points, then the previous x anchor point for P{i} does not exist.

The "next x anchor point" of P{i} is the first x-aligned point found during a forward traversal through the sequence of points starting from P{i} and wrapping around from P{n} to P1, i.e., P{i}, P{i+1}, ..., P{n−1}, P{n}, P1, P2, ..., P{i−1}. If the contour C does not contain any x-aligned points, then the next x anchor point for P{i} does not exist.

Let contour C be a contour consisting of a sequence of points P1, P2, ..., P{n} where n≧2. Let P{i} be a y-free point:

The "previous y anchor point" of P{i} is the first y-aligned point found during a backwards traversal through the sequence of points starting from P{i} and wrapping around from P1 to P{n}, i.e., P{i}, P{i−1}, ..., P2, P1, P{n}, P{n−1}, ..., P{i+1}. If contour C does not contain any y-aligned points, then the previous y anchor point for P{i} does not exist.

The "next y anchor point" of P{i} is the first y-aligned point found during a forward traversal through the sequence of points starting from P{i} and wrapping around from P{n} to P1, i.e., P{i}, P{i+1}, ..., P{n−1}, P{n}, P1, P2, ..., P{i−1}. If contour C does not contain any y-aligned points, then the next y anchor point for P{i} does not exist.

The "original x-ratio" between an x-free point P, its previous x anchor point A1, and its next x anchor point A2 is the ratio $(px-x1)/(x2-x1)$, where px is P's original x coordinate, x1 is A1's original x coordinate, and x2 is A2's original x coordinate. The original x-ratio is undefined if either of P's anchor points does not exist or if $(x2-x1)$ is zero.

The "original y-ratio" between a y-free point P, its previous y anchor point A1, and its next y anchor point A2 is the ratio $(py-y1)/(y2-y1)$, where py is P's original y coordinate, y1 is A1's original y coordinate, and y2 is A2's original y coordinate. The original y-ratio is undefined if either of P's anchor points does not exist, or if $(y2-y1)$ is zero.

Linked Listed Terminology

The "head" and "tail" of a linear linked list L are the first and last elements of L, respectively. An element E that is not currently in L can be "prepended" to L by making E the new head of L. Similarly, E can be "appended" to L by making E the new tail of L.

Alignment Method Strategy

The following general description applies to the method described below:

The method is invoked dynamically during rendering, see the related Applications. Therefore, the method is designed to achieve a favorable balance between high quality, small memory consumption, and computational efficiency. The method can be invoked on any outline-based character, but it is designed and optimized for CJK characters.

CJK outline-based characters are largely comprised of horizontal and vertical features. Therefore, the method detects horizontal and vertical features of the character and aligns them to the sampling grid. These features are called "segment pairs" in this description, see the Segment Pair terminology section above for a precise definition.

The method does not align other features to the sampling grid, e.g., curves or diagonal lines. Coordinates that are not aligned to the sampling grid are instead hinted using interpolation, see below for details. This overall strategy balances the competing goals of high quality and high runtime performance.

Performing automatic grid fitting for CJK outline-based characters is challenging because of two competing goals: contrast and consistency. High contrast can be achieved by aligning both segments of a segment pair to the sampling grid, thereby producing a horizontal or vertical feature with two sharp edges.

High consistency can be achieved by preserving the original pair widths of segment pairs during grid fitting so that horizontal and vertical features appear to have consistent stroke weights when rendered into the final image. These two goals compete because aligning both segments of a segment pair to the sampling grid generally requires modifying the original pair width. Similarly, preserving the original pair width generally prevents both segments of a segment pair from being aligned to the sampling grid simultaneously.

Consistency is more important to the overall visual quality of a rendered character than contrast, especially when multiple characters are viewed together on a single page of text. In particular, it is often preferable to accept a slight reduction in contrast, e.g., by aligning only one of the two segments in a segment pair to the sampling grid, instead of aligning both segments to the sampling grid, in exchange for a significant increase in consistency, e.g., by preserving the original pair widths of the segment pairs.

For this reason, the method generally preserves the original pair widths of segment pairs during grid fitting, with the following exception. Segment pairs that are relatively thin, e.g., less than 1 pixel, are difficult to see when rendered. Therefore, the method increases the original pair widths of thin segment pairs by a ppem-dependent amount, thereby increasing the visibility and contrast of thin features without a discernible compromise in consistency.

At small to moderate ppems, e.g., 30 ppems and less, aligning both segments of a segment pair to the sampling grid generally leads to unattractive results and obvious inconsistencies. Aligning both segments of a segment pair leads to slightly better results at large ppems, e.g., 80 ppems and greater. However, even at large ppems, there are cases where consistency issues may arise in individual characters. For this reason, the method never explicitly aligns both segments of a segment pair to the sampling grid.

As shown in FIG. 2A, the method attempts to determine 202 the orientation of the outer contours in an outline-based character, see Step 2 below. The orientation enables the method to detect segment pairs accurately in subsequent steps. The method assumes that all outer contours in the outline-based character have the same orientation. If the outline-based character does not have this property, the method may not detect segment pairs accurately.

Figure 4:
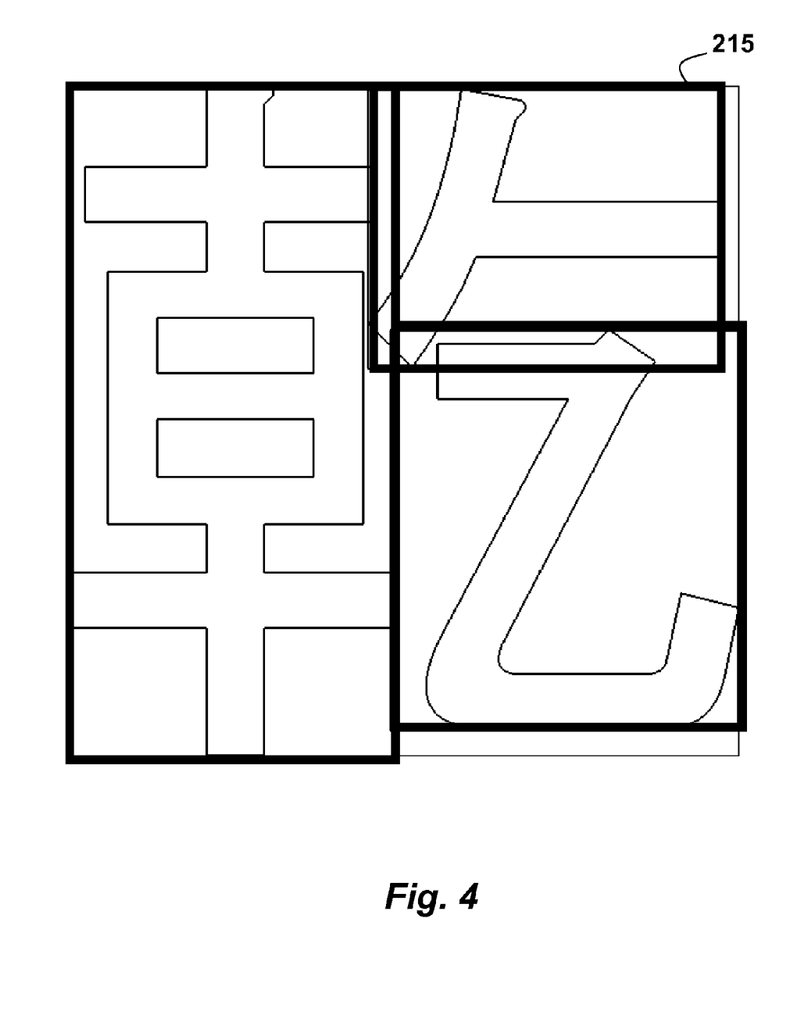
FIG. 4 is a diagram of contours grouped into radicals according to embodiments of the invention.

As shown in FIG. 4, the method organizes contours into groups called "radicals" 215. A radical is a group of spatially-related components of an outline-based character, see the Contour and Radical terminology section above for a formal definition. The method performs feature detection separately and independently for each radical, using independent alignment zones. This improves the accuracy of feature detection by preventing segment pairs from forming between spatially-distant regions of the character. There are no dependencies between radicals during feature detection. Consequently, hardware and multi-core implementations can perform feature detection within radicals completely in parallel.

The method detects and resolves "collisions" between segment pairs, thereby preventing important features from becoming visually indistinguishable, see below for details.

Collision resolution plays a significant role in the quality of the results. The method uses a greedy method to resolve collisions. This method is computationally efficient but may not always find the optimal grid fitting configuration. In practice, however, the method produces high-quality results across a wide range of characters. During collision resolution, the method does not attempt to preserve the original spacing or the original spacing proportions between segments pairs.

To improve consistency in appearance across multiple characters, the method always aligns topmost and bottom-most horizontal segment pairs to the nearest grid point. Similarly, the method always aligns leftmost and rightmost vertical segment pairs to the nearest grid point. This approach prevents further grid fitting adjustments, e.g., due to collision resolution, from affecting important horizontal and vertical features at the edges of characters, resulting in better alignment of these features across multiple characters when viewed together.

The method fits horizontal segment pairs and vertical segment pairs separately and independently. Because the method contains no dependencies between horizontal segment pairs and vertical segment pairs, hardware and multi-core implementations can perform grid fitting on horizontal segment pairs and grid fitting on vertical segment pairs completely in parallel.

The present method follows the TrueType convention for rendering characters, where rendering is performed using samples located at pixel centers. Therefore, the method performs grid fitting by aligning coordinates to half-integers, e.g., 0.5, 1.5, and 2.5. To optimize performance and to maximize code re-use between floating point and fixed point implementations, Steps 8 through 11 of the method, see below, perform grid fitting using the integer pixel grid. Adjustments to the integer hinted coordinates to accommodate the half-integer sampling grid are performed in Step 12 of the method, see below.

Method Description

FIGS. 2A and 2B show, in greater detail, the steps of the method for aligning contours of a character to multiple alignment zones according to embodiments of the invention.

Figure 3:
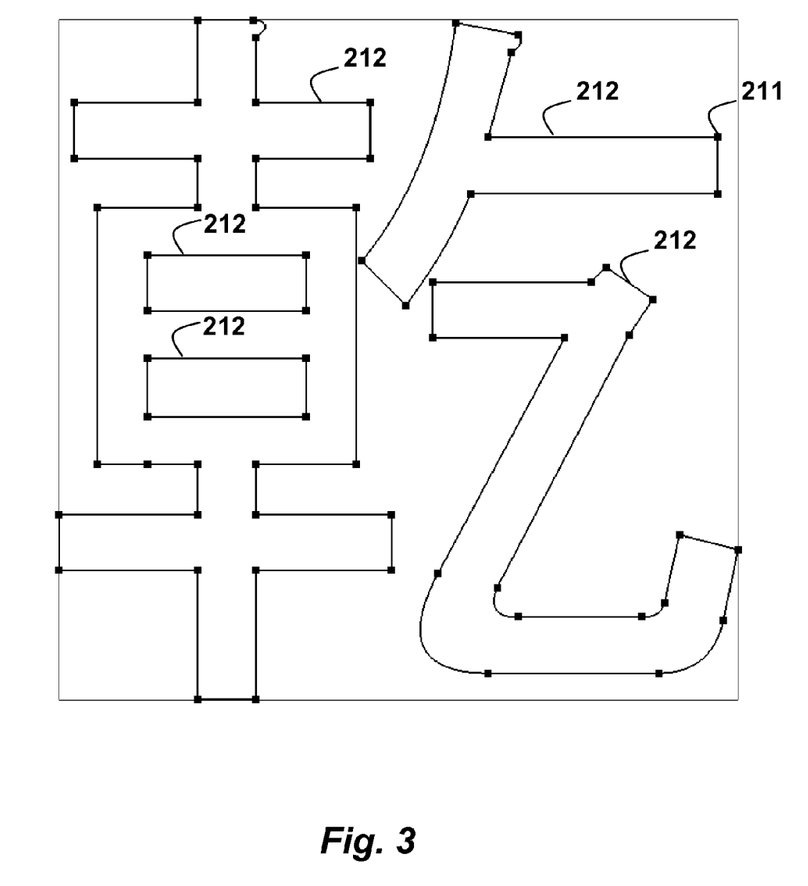
FIG. 3 is a diagram of an outline character with points and contours according to embodiments of the invention.

Step 1. Determine 201 points 211 and contours 212 from the input pen commands 213. FIG. 3 shows a character with 72 points and 5 contours.

Step 2. Determine 202 an orientation 214 of outer contours in the character. The contours can be oriented clockwise or counterclockwise. This determination is made by the following steps:

Step 2a. Determine pMinY, the point in the character with the minimum original y coordinate. The coordinate pMinY is contained in an outer contour C of the character.

Step 2b. Compute the signed area A of the triangle defined by the three points (pMinY, pMinYN, and pMinYP), where pMinYN is the point immediately following pMinY and pMinYP is the point immediately preceding pMinY.

Step 2c. If A is positive, contour C is oriented clockwise; proceed with Step (2h).

Step 2d. If A is negative, contour C is oriented counterclockwise; proceed with Step (2h).

Step 2e. Otherwise, A is zero or approximately zero and therefore the three points (pMinY, pMinYN, and pMinYP) are collinear or approximately collinear. If pMinYN lies to the left of pMinYP, then contour C is oriented clockwise; proceed with Step (2h).

Step 2f. If pMinYN lies to the right of pMinYP, then contour C is oriented counterclockwise; proceed with Step (2h).

Step 2g. pMinYN and pMinYP have identical original x coordinates, so the character is degenerate around pMinY. It is impossible to determine C's orientation by examining the three points pMinY, pMinYN, and pMinYP, so assume that C's orientation is clockwise.

Step 2h. Done.

The orientation of the contour C is assumed to be the orientation of all outer contours in the character.

Step 3. Determine 203 radicals 215. FIG. 4 shows three radicals 215 for the contours 212 of FIG. 3. Grid fitting is done independently for each radical 215. A radical is a set of contours containing a single root contour and all of its descendents. Radicals are determined using the following two-steps:

Step 3a. Determine the parent of each contour. This step effectively constructs a directed acyclic graph (DAG) 235 of contours. In the DAG, each contour is linked to its parent. Root contours do not have parents, i.e., they are the "topmost" elements in the DAG.

Step 3b. Determine the radical that contains each contour. Each contour I has a unique ancestor R that is a root contour. Determine R by repeatedly following I's parent link, i.e., I→parent, I→parent→parent, etc., until a contour is found that has no parent. This contour is R. This step effectively "flattens" the DAG hierarchy into two layers with root contours in the "top" layer and internal contours in the "bottom" layer.

Step 4. Determine 204 simple segments 216. Horizontal simple segments and vertical simple segments are determined by traversing the points 211, and by applying the definitions of a horizontal simple segment and a vertical simple segment as described above.

Step 5. Determine 205, for each radical 215, merged segments 217. For each radical R 215, merge the horizontal simple segments in R into horizontal merged segments by applying the definition of a horizontal merged segment described above. Similarly, for each radical R 215, merge the vertical simple segments in R into vertical merged segments by applying the definition of a vertical merged segment described above. Merged segments are represented using linked lists of simple segments. There is no significance to the ordering of simple segments within these linked lists.

Figure 5B:
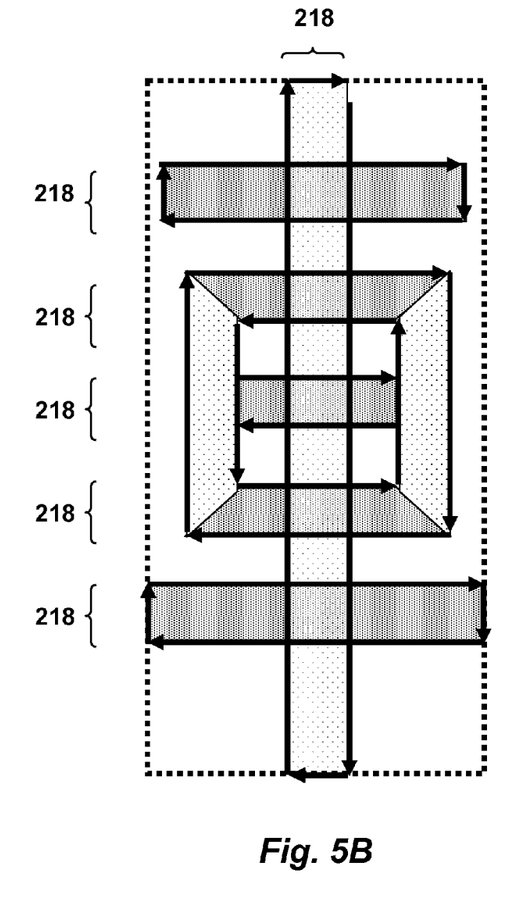

Step 6. For each radical R 215, determine 206 horizontal segment pairs 218 from R's horizontal merged segments and determine 206 vertical segment pairs from R's vertical merged segments. FIG. 5A shows five pairs 218 of line segments 216, and FIG. 5B shows all the pairs 218 for one radical 215.

Horizontal segment pairs are determined using a brute-force method that considers all possible horizontal segment pairs {H1, H2}, where H1 and H2 are horizontal merged segments in R. {H1, H2} is a valid segment pair if and only if all of the following conditions are satisfied:

1. {H1, H2} must span a filled region of the character. This occurs if either: (1) H1 is oriented from left to right and the outer contours of the character are oriented counterclockwise, or (2) H1 is oriented from right to left and the outer contours of the character are oriented clockwise. The orientation of the outer contours of the character is determined above in Step 2.

2. The first pair width of {H1, H2} must be at most (MAX_WIDTH_FRAC*ppem) units in real-valued image coordinates, where ppem is the user-specified number of pixels per em used to render the character and MAX_WIDTH_FRAC is a specified pre-defined constant.

3. The overlap ratio between H1 and H2 must be at least MIN_OVERLAP_RATIO, where MIN_OVERLAP_RATIO is a specified pre-defined constant.

4. Let w be the first pair width of {H1, H2}. There cannot exist a horizontal merged segment H3 in R such that the first pair width of {H3, H2} is less than w. Similarly, there cannot exist a horizontal merged segment H3 in R such that the first pair width of {H1, H3} is less than w. Intuitively, {H1, H2} must be the thinnest horizontal segment pair over all possible horizontal segment pairs containing either H1 or H2.

Vertical segment pairs are determined in the same manner as for horizontal segment pairs, substituting x coordinates for y coordinates.

Step 7. For each radical R 215, append 207 each horizontal segment pair in R to an uninitialized horizontal segment pair array 219. Similarly, for each radical R 215, append each vertical segment pair in R to an uninitialized vertical segment pair array.

Step 8. Determine 258 the hinted coordinate 220 of each horizontal segment pair in the horizontal segment pair array 219 by computing the floor of its original coordinates. Similarly, determine the hinted coordinate of each vertical segment pair in the vertical segment pair array by computing the floor of its original coordinates. The hinted coordinates of the segment pairs determined in this step can be modified below to resolve collisions, see Step 11.

Step 9. Sort 259 the horizontal segment pairs in the horizontal segment pair array into ascending order, i.e., sort by non-decreasing original coordinates. Similarly, sort the vertical segment pairs in the vertical segment pair array into ascending order, i.e., sort by non-decreasing original coordinates. Thus, the array 221 is sorted.

Step 10. Identify 260 the child segment pairs of each horizontal segment pair in the horizontal segment pair array and construct a directed acyclic graph (DAG) 222. Similarly, identify the child segment pairs of each vertical segment pair in the vertical segment pair array and construct a corresponding DAG. The DAGs are represented implicitly by linking each segment pair to its child segment pairs.

The purpose of constructing these DAGs is to detect and resolve collisions between segment pairs in Step 11. A collision between a segment pair P and a child segment pair C cannot occur during collision resolution if the current hinted coordinates 220 of P and C differ by more than W+2 pixels, where W is equal to the width of C's original pair rounded to the nearest integer. Therefore, to improve runtime efficiency, a link in the DAG is added between P and C if and only if their hinted coordinates differ by (W+2) pixels or less.

Step 11. Detect 261 colliding segment pairs and resolve collisions that occur in Step 8 using a greedy bottom-up method. Visually, colliding segment pairs appear to be a single thick segment pair, instead of two separate segment pairs. Collisions can be resolved in some cases by adding +1 or −1 to the hinted coordinate of one of the segment pairs so that the two segment pairs become one pixel farther apart, see details below.

Collisions are resolved using a greedy method in which each DAG of segment pairs determined in Step 10 is traversed in a bottom-up order, i.e., from the bottommost descendants to the topmost ancestors. Because the segment pairs are sorted in ascending order in Step 9, this bottom-up traversal is accomplished by visiting each segment pair in the segment pair array, beginning with the first segment pair in the segment pair array and ending with the last segment pair in the segment pair array.

Let M1 and M2 be the current hinted coordinates of the first and last segment pairs in the segment pair array. To obtain consistent alignment of important features across multiple characters, all segment pairs whose current hinted coordinates are equal to M1 will remain fixed at M1, i.e., these segment pairs will not be affected by collision resolution. Similarly, all segment pairs whose current hinted coordinates are equal to M2 will remain fixed at M2.

For each segment pair P visited during a bottom-up traversal of the segment pair array, apply the following steps:

Step 11a. If P's current hinted coordinate is equal to M1, then proceed to the next segment pair.

Step 11b. If P's current hinted coordinate is equal to M2, then apply the following steps for each child C of P that collides with P:

Step 11b1. If C barely collides with P, proceed to Step (11b2). Otherwise, proceed with Step (11b4).

Step 11b2. If C is rounded up and can be rounded down without colliding with any of its children, then round down C and proceed with Step (11b5).

Example: If C's original coordinate is 3.4, then C's hinted coordinate is normally "rounded up" to 3.0. "Rounding down" instead produces the integer 2.0. Refer to the definitions of "rounded up" and "rounded down" in the Collision terminology section above. This step attempts to eliminate a collision and always avoids introducing any new collisions.

Step 11b3. If C is rounded up and the segment pair tree with root C can be rounded down without creating any collisions whatsoever in the segment pair tree, then round down the segment pair tree and proceed with Step (11b5). This step attempts to eliminate a collision and always avoids introducing any new collisions.

Step 11b4. If P still collides with C, align C to P. For example, if C's hinted coordinate is 4.0, P's hinted coordinate is 5.0, and C's pair width is 1.2 pixels, then align C to 5.0.

Step 11b5. Done.

Step 11c. If P's current hinted coordinate lies between M1 and M2, then apply the following steps for each child C of P that collides with P:

Step 11c1. If C barely collides with P, proceed to Step (11c2). Otherwise, proceed with Step (11c5).

Step 11c2. If C is rounded up and can be rounded down without colliding with any of its children, then round down C and proceed with Step (11c6). For example, if C's original coordinate is 3.4, then C's hinted coordinate is normally "rounded up" to 3.0. "Rounding down" instead produces the integer 2.0. Refer to the definitions of "rounded up" and "rounded down" in the Collision terminology section above. This step attempts to eliminate a collision and always avoids introducing any new collisions.

Step 11c3. If C is rounded up and the segment pair tree with root C can be rounded down without creating any collisions whatsoever in the segment pair tree, then round down the segment pair tree and proceed with Step (11c6). This step attempts to eliminate a collision and always avoids introducing any new collisions.

Step 11c4. If P is rounded down, then round up P and proceed with Step (11c6). Example: If P's original coordinate is 5.8, then P's hinted coordinate is normally rounded down to 5.0, i.e., floor(5.8−0.5)=floor(5.3)=5.0. Rounding up instead produces the integer 6.0. This step attempts to eliminate a collision but may introduce a collision between P and a parent of P. This potential collision will be treated when processing the parent of P in a subsequent iteration of the bottom-up traversal of the DAG.

Step 11c5. Align P to C. For example, if C's hinted coordinate is 4.0 and P's hinted coordinate is 5.0, then align P to 4.0.

Step 11c6. Done, and collisions have been eliminated from the array of segment pairs 223.

For Step 11, Steps (11b2) through (11b3) and Steps (11c2) through (11c4) attempt to round segment pairs C and P so that they are at least W+1 pixels apart, where W is C's original pair width. However, there are some cases in which collisions cannot be resolved by this method. Because C and P cannot be visually distinguished in these cases, Steps (11*b*4) and (11*c*5) align P and C, thereby simplifying the appearance of the character by aligning two segment pairs to the same coordinate. The difference between Step (11*b*4) and Step (11*c*5) is that in the former step, C is aligned to P, whereas in the latter step, P is aligned to C.

Step 12. Grid fit 262 each horizontal segment pair {S1, S2} in the horizontal segment pair array 223:

Step 12*a*. Determine the original pair width w of {S1, S2} in real-valued image coordinates.

Step 12*b*. Determine the adjusted pair width w' of {S1, S2} as follows. Initialize w' to w. If w' is less than 0.5, then set w' to 0.5. If w' is less than 1.0, then set w'=w'+f*(1−w'), where f is the pair width adjustment factor. The value f is computed as (ppem*0.0625−0.875) and clamped to the range [0,1]. This step increases the original pair width by a ppem-dependent amount to increase the visibility and contrast of thin segment pairs.

The pair width adjustment factor f lies in the range [0, 1] and behaves as a linear ramp from 0, when ppem=14, to 1, when ppem=30. Therefore, the pair width adjustment factor is minimized at 14 ppems and maximized at 30 ppems. These values were determined empirically to achieve a good balance between contrast and consistency.

Step 12*c*. Grid fit the points of S1 and S2 as follows. Let omy1 and omy2 be the original middle y coordinates of S1 and S2, respectively. The hinted y coordinate hy1 of S1 was determined earlier by Step 8 and Step 11, see above.

Determine the hinted y coordinate hy2 of S2 by adding the adjusted pair width, i.e., w' to the hinted y coordinate of S1, i.e., hy1.

For each point P contained in S1, determine P's hinted y coordinate by adding (hy1−omy1+0.5) to P's original y coordinate. This step effectively preserves the original slope of S1. The additional delta of 0.5 causes point P to be aligned to the half-integer pixel grid.

For each point P contained in S2, determine P's hinted y coordinate by adding (hy2−omy2+0.5) to P's original y coordinate. This step effectively preserves the original slope of S2. The additional delta of 0.5 causes point P to be aligned to the half-integer pixel grid.

Grid fit 262 each vertical segment pair in the vertical segment pair array using the same method described above for horizontal segment pairs, substituting x coordinates for y coordinates.

Step 13. For each radical R 215, perform grid fitting 263 on the x-free points in R:

Step 13*a*. Let point P be an x-free point in R. Determine P's previous x anchor point A1 and P's next x anchor point A2. The point P may not have any anchor points, i.e., neither A1 nor A2 exist.

Step 13*b*. If neither of P's anchor points exist, then proceed with Step (13*g*). The point P will either have exactly zero anchor points, or exactly two anchor points.

Step 13*c*. Determine the original x-ratio xr between P, A1, and A2. If xr is undefined, i.e., A1 and A2 have identical original x coordinates and therefore the denominator of xr is zero, then determine P's hinted x coordinate by preserving the original x-distance between point P and A1 and proceed with Step (13*g*).

Step 13*d*. If xr is less than zero, then: (1) P's original x coordinate is closer to A1's original x coordinate than to A2's original x coordinate, and (2) P's original x coordinate does not lie between the original x coordinates of the anchor points. In this case, determine P's hinted x coordinate by preserving the original x-distance between point P and A1 and proceed with Step (13*g*).

Step 13*e*. If xr is greater than 1, then: (1) P's original x coordinate is closer to A2's original x coordinate than to A1's original x coordinate, and (2) P's original x coordinate does not lie between the original x coordinates of the anchor points. In this case, determine P's hinted x coordinate by preserving the original x-distance between point P and A2 and proceed with Step (13*g*).

Step 13*f*. xr lies in the range [0,1] and therefore P's original x coordinate: (1) is equal to A1's original x coordinate, (2) is equal to A2's original x coordinate, or (3) lies between the original x coordinates of the anchor points. Determine P's hinted x coordinate by linearly interpolating between the hinted x coordinates of the anchor points.

Step 13*g*. Done.

For each radical R 215, perform grid fitting 263 on the y-free points in R using the same method as described above for x-free points, substituting y coordinates for x coordinates.

Step 14. Copy 264 the hinted x and y coordinates from points to the output pen commands.

At this point, the output pen commands have been aligned with the sampling grid, and rendering 240 can proceed.

Operating Environment

The invention is operational with numerous general purpose or special purpose computing system environments or configurations. Examples of well known computing systems, environments, and/or configurations that are suitable for use with the invention include, but are not limited to, personal computers, server computers, handheld or laptop devices, multiprocessor or multi-core systems, graphics processing units (GPUs), application-specific integrated circuits (ASICs), field programmable gate arrays (FPGAs), microcontroller-based systems, set top boxes, programmable consumer electronics, network PCs, minicomputers, mainframe computers, distributed computing environments that include any of the above systems or devices, and the like. A monitor or other type of display device is connected to any of the above systems to enable the display of the alignment of the invention.

As described above, the method performs feature detection separately and independently for each radical, using independent alignment zones. This improves the accuracy of feature detection by preventing segment pairs from forming between spatially-distant regions of the character. There are no dependencies between radicals during feature detection. Consequently, hardware and multi-core implementations can perform feature detection within radicals completely in parallel. For example, one core of a multi-core processor can perform feature detection on a particular radical and another core of the multi-core processor can perform feature detection on a different particular radical.

Also as described above, the method contains no dependencies between horizontal segment pairs and vertical segment pairs. Consequently, hardware and multi-core implementations of the method can process horizontal segment pairs and vertical segment pairs completely in parallel. For example, one core of a multi-core processor can perform alignment for the horizontal segment pairs and another core of the multi-core processor can perform alignment for the vertical segment pairs.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for aligning a character to a sampling grid of an image, wherein an original path tracing an outline of the character is specified by input pen commands having original coordinates, comprising a processor for performing the method, the method comprising the steps of:

determining points and contours of the input pen commands;

determining an orientation of each contour;

constructing a first directed acyclic graph (DAG) indicating a hierarchical relationship of related contours;

determining radicals of a group of related contours using the first DAG;

determining simple segments of the contours;

merging the simple segments independently for each radical;

determining segment pairs for the merged segments;

determining hinted coordinates for the segment pairs;

sorting the segment pairs and constructing a second DAG for the sorted segment pairs;

resolving collisions between the segment pairs using the second DAG;

determining x-free points and y-free points for each radical; and fitting the segments pairs, the x-free points, and the y-free points to the sampling grid independently for each radical and storing a result of the fitting in output pen commands having the hinted coordinates to align the outline of the character to the sampling grid of the image.

2. The method of claim 1, wherein the radicals are processed in parallel.

3. The method of claim 1, wherein the sampling grid is a pixel grid of the image and wherein the image is displayed on a screen.

4. The method of claim 1, wherein the sampling grid is a sub-pixel grid of the image and wherein the image is displayed on a screen.

5. The method of claim 1, further comprising:

rendering the output pen commands.

6. The method of claim 1, wherein the resolving traverses the second DAG in a greedy bottom-up process.

7. The method of claim 1, wherein topmost and bottommost horizontal segments pairs and leftmost and rightmost vertical segments pairs are aligned to nearest grid points in the sampling grid.

8. The method of claim 1, wherein the fitting further comprises:

determining an original pair width and an adjusted pair width; and fitting the segments to the sampling grid using the original pair width and the adjusted pair width.

9. The method of claim 1, wherein the fitting further comprises:

determining previous x anchor points and next x anchor points for the x-free points in each radical; and fitting the x-free points to the sampling grid using the previous x anchor points and the next x anchor points.

10. The method of claim 1, wherein the fitting further comprises:

determining previous y anchor points and next y anchor points for the y-free points in each radical; and fitting the y-free points to the sampling grid using the previous y anchor points and the next y anchor points.

* * * * *